(12) United States Patent
Chen

(10) Patent No.: US 6,758,014 B2
(45) Date of Patent: Jul. 6, 2004

(54) TRELLIS STRUCTURE

(76) Inventor: Tai-Shan Chen, P.O. Box 2103, Taichung (TW)

( * ) Notice: Subject to any disclaimer, the term of this patent is extended or adjusted under 35 U.S.C. 154(b) by 85 days.

(21) Appl. No.: 10/270,430

(22) Filed: Oct. 15, 2002

(65) Prior Publication Data

US 2004/0068938 A1 Apr. 15, 2004

(51) Int. Cl.$^7$ ............................................... C04H 15/00
(52) U.S. Cl. .............................. 52/63; 52/79.1; 47/20.1; 47/31; 135/121; 135/122
(58) Field of Search ......................... 52/63, 79.1, 79.6, 52/79.9, 79.12, 90.1; 135/87, 88.1, 90, 95, 96, 97, 120–123, 156–157, 158–160, 119, 115, 913, 117, 120.3; 47/20.1, 29.1, 29.2, 29.4, 31

(56) References Cited

U.S. PATENT DOCUMENTS

| | | | | |
|---|---|---|---|---|
| 4,690,192 A | * | 9/1987 | Stilling ........................ | 160/57 |
| 4,731,960 A | * | 3/1988 | Sease ......................... | 52/36.6 |
| 4,860,778 A | * | 8/1989 | Pohl ........................... | 135/97 |
| 4,899,797 A | * | 2/1990 | Green ......................... | 160/395 |
| 5,033,529 A | * | 7/1991 | Koschade ................... | 160/398 |
| 5,044,131 A | * | 9/1991 | Fisher ......................... | 52/63 |
| 5,076,033 A | * | 12/1991 | Patsy, Jr. .................... | 52/222 |
| 5,224,306 A | * | 7/1993 | Cramer ....................... | 52/63 |
| 5,237,785 A | * | 8/1993 | Lukes ......................... | 52/86 |
| 5,242,004 A | * | 9/1993 | Stilling ....................... | 160/57 |
| 5,469,672 A | * | 11/1995 | Fisher ......................... | 52/74 |
| 5,596,843 A | * | 1/1997 | Watson ....................... | 52/71 |
| 5,906,078 A | * | 5/1999 | Cramer ....................... | 52/222 |
| 5,953,873 A | * | 9/1999 | Livingston et al. .......... | 52/222 |
| 6,314,684 B1 | * | 11/2001 | Aviram ........................ | 52/11 |
| 6,374,566 B1 | * | 4/2002 | Weeks ........................ | 52/655.2 |
| 6,637,160 B2 | * | 10/2003 | Brooks ........................ | 52/66 |
| 6,668,495 B1 | * | 12/2003 | Prince ......................... | 52/63 |

\* cited by examiner

*Primary Examiner*—Jeanette Chapman

(57) ABSTRACT

Trellis structure including a frame body and a roof. The frame body is composed of multiple upright columns, press beams and support rods. The roof is composed of a ridge beam, multiple press beams and multiple support rods. The press beam is a hollow beam having an opening on one side. By means of multiple fixing members and bolts, the press beams are fixedly connected with the columns and the ridge beam to form a pattern of a house. The other side of the press beam is formed with a recessed insertion section. In cooperation with a press bar and a clamping plate, a light shading mesh is fixed around the frame body and on the top face of the roof to form a trellis with shading effect.

10 Claims, 17 Drawing Sheets

TRELLIS STRUCTURE

BACKGROUND OF THE INVENTION

The present invention is related to an improved trellis structure that can be conveniently assembled.

With reference to FIGS. 27–29, a conventional greenhouse trellis for culture is composed of multiple upright columns 71, transverse beams 72 and a ridge beam 73 which are connected by various patterns of connecting members, such as screws. The trellis is covered by a light shading mesh (not shown) or plastic sheet (not shown) for achieving shading effect. In order to prevent the light shading mesh or plastic sheet from being broken during drilling or screwing, a fixing member 8 is provided for connecting the columns with the beams. The fixing member 8 has an insertion channel 81 defined therein. The fixing member 8 is first connected with the upright column 71, transverse beam 72 or the ridge beam 73. Then the light shading mesh or plastic sheet is inserted into the insertion channel 81 of the fixing member 8 for fixing the light shading mesh or plastic sheet. Accordingly, multiple fixing members 8 are necessary to the trellis during assembling. This complicates the assembly of the trellis and leads to increment of cost.

The fixing member 8 is connected with the column 71, transverse beam 72 or the ridge 73 by connecting members 9 and the connecting member of the preferred embodiment of the convention trellis structure is a screw. Consequently, the exposed heads of the screws often hook and break the light shading mesh or plastic sheet when the light shading mesh or plastic sheet is inserted into the fixing member 8.

SUMMARY OF THE INVENTION

It is therefore a primary object of the present invention to provide an improved trellis structure in which a press beam is used instead of the conventional fixing member. The press beam of the trellis of the present invention has double functions of supporting the trellis and fixing the light shading mesh or plastic sheet. Therefore, the components of the trellis are simplified and the assembling procedure of the trellis is facilitated and the cost for the trellis is lowered.

The present invention can be best understood through the following description and accompanying drawings wherein:

DETAILED DESCRIPTION OF THE PREFERRED EMBODIMENTS

Figure 1:
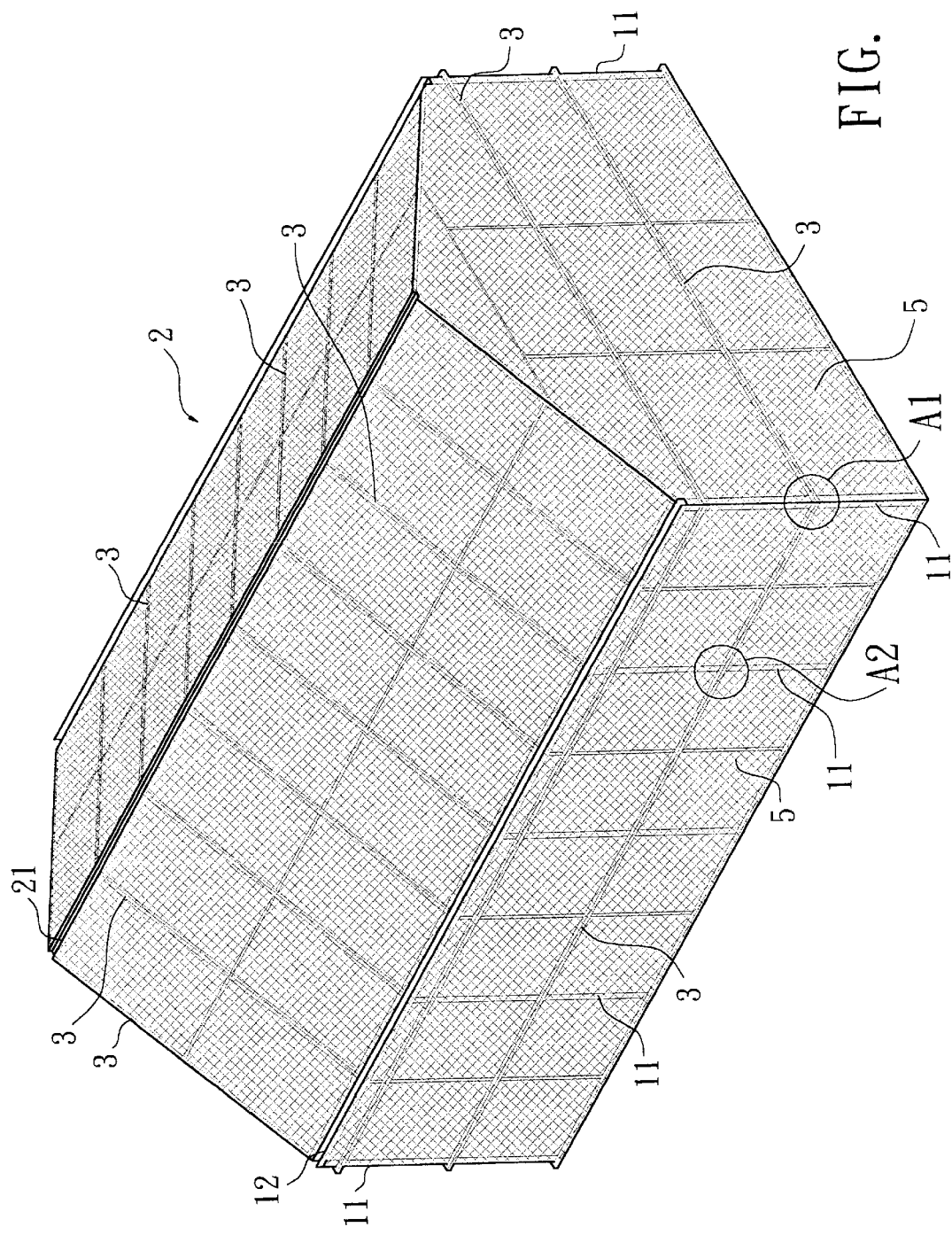
FIG. 1 is a perspective view of the trellis structure in accordance with the present invention.
Figure 2:
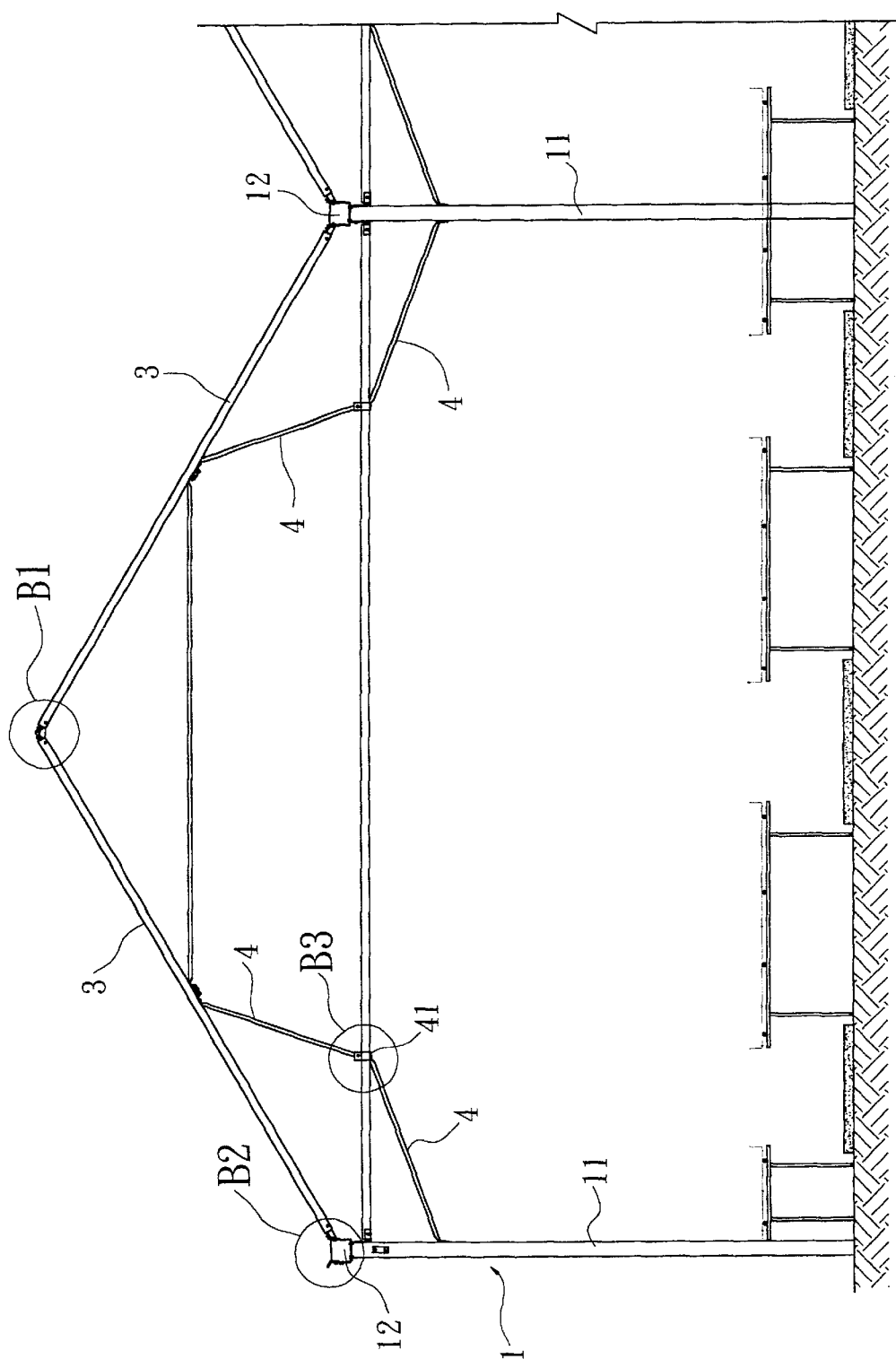
FIG. 2 shows the interior of the trellis of the present invention.
Figure 3:
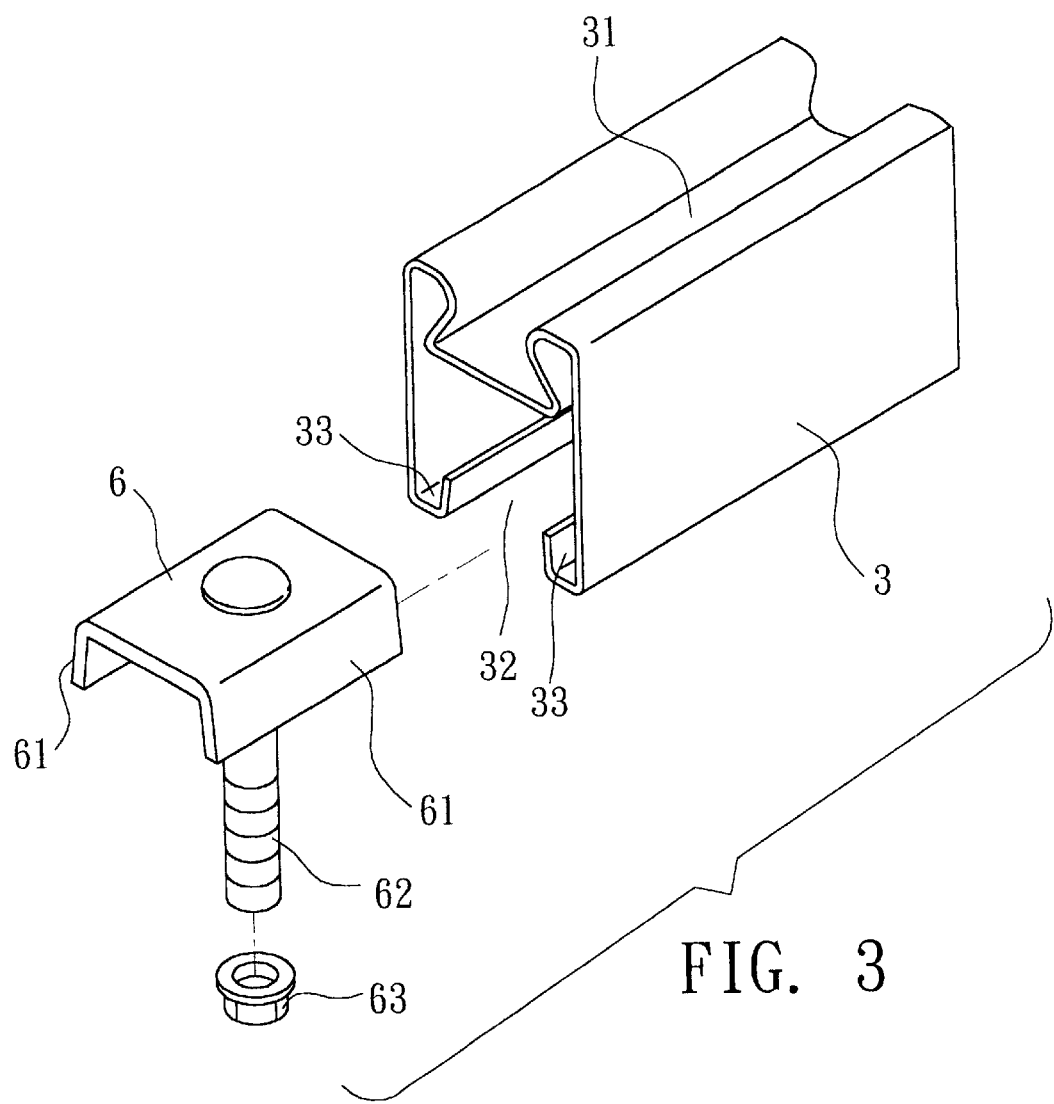
FIG. 3 is a perspective view showing the press beam and the cooperative fixing plate of the present invention.

Please refer to FIGS. 1 to 3. The trellis structure of the present invention includes a frame body 1 and a roof 2 covered on the frame body 1. The frame body 1 includes multiple upright columns 11 that surround a rectangular range with fixed area. The bottom end of each of the upright columns 11 is fixed underground. A longitudinally extending draining flute 12 is fixed on top ends of each of the upright columns 11 that are located on two opposite sides of the trellis structure by screws. Multiple press beams 3 are transversely connected with the upright columns 11 along the periphery of the frame body 1. In addition, multiple press beams 3 are also connected between the columns 11 near the top ends thereof. Each end of the press beam 3 is fixedly connected with the column 11 by a support rod 4 for reinforcing the press beam 3.

The roof 2 is fixedly disposed on the portion of the frame body 1. The roof 2 has a ridge beam 21 fixedly disposed above a center-line of the frame body 1. Multiple downward inclined press beams 3 are fixedly connected between two opposite sides of the ridge beam 21 and the draining flutes 12 of the frame body 1. The support rods 4 are fixedly connected between the press beams 3 of the roof 2 and the press beams 3 between the top ends of the columns 11 for reinforcing the roof 2. Accordingly, the roof 2 is assembled with the frame body 1 to form a pattern of a house.

The press beam 3 is hollow. One side of the press beam 3 is formed with a recessed insertion section 31, while the other side of the press beam 3 is formed with an opening 32 opposite to the recessed insertion section 31. Two opposite sides of the opening 32 each has a inward extending hook sections 33. Multiple fixing plates 6 are slidably received in the press beam 3 and engaged to the hook sections 33 of the press beam 3. Via the insertion section 31, the press beam 3 is outward fixedly connected on the frame body 1 and the roof 2.

Two longitudinal sides of the fixing plate 6 respectively have two perpendicularly extending engaging plates 61 for engaging with the hook sections 33 of the press beam 3. A bolt 62 is perpendicularly fitted through the center of the fixing plate 6. A fixing nut 63 is used in cooperation with the bolt 62.

The periphery of the frame body 1 and the top face of the roof 2 are covered by a shading mesh 5. In this embodiment, the shading mesh 5 is a light shading mesh, which is partially and fixedly inserted in the insertion section 31 of the press beam 3.

Figure 4:
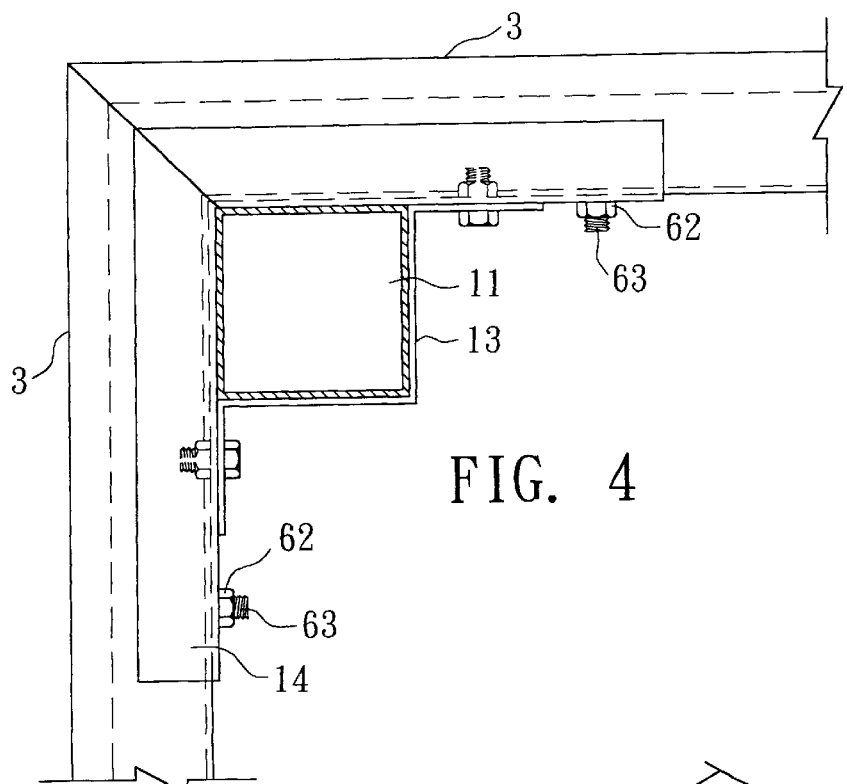
FIG. 4 shows the connection between the column in the corner of the frame body and two press beams of the present invention, in which the two press beams are normal to each other.
Figure 4A:
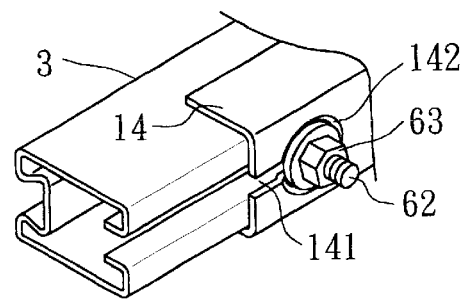
FIG. 4a is a perspective view of a part of FIG. 4.
Figure 5:
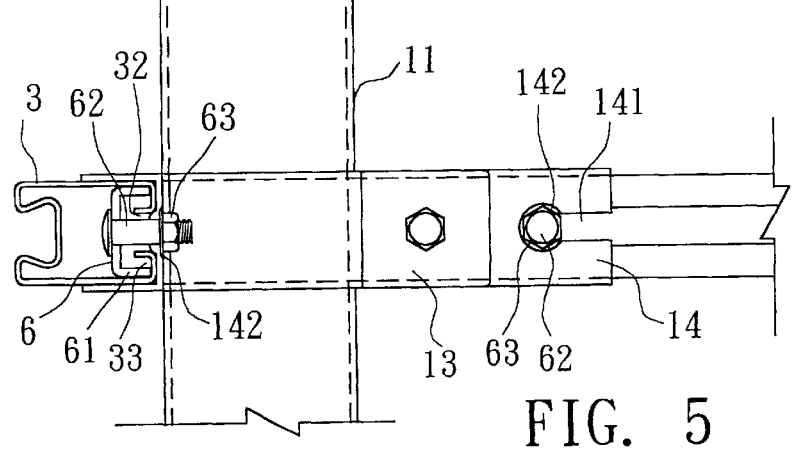
FIG. 5 is a side view according to FIG. 4.

Please refer to FIGS. 4 and 5 that show the connection A1 between the column and the lateral press beams of FIG. 1. The upright column 11 in the corner of the frame body 1 is connected with two lateral press beams 3 in such a manner that via an insertion plate 13, a substantially L-shaped corner plate 14 is fixed on the corner of the upright column 11 by screws for connecting with the lateral press beams 3. The corner plate 14 is inserted in the two press beams 3 that are normal to each other. In addition, two fixing plates 6 are respectively inserted into the press beams 3. Each side of the corner plate 14 is formed with an inward extending split 141. An inner end of the split 141 is formed with a dent 142. The bolt 62 of the fixing plate 6 is fitted into the split 141 and the fixing nut 63 is positioned in the dent 142 and tightened on the bolt 62. Accordingly, the engaging plates 61 of the fixing plate 6 abut against the hook sections 33 of the press beams 3 to fix the two lateral press beams 3 on the column 11.

Figure 6:
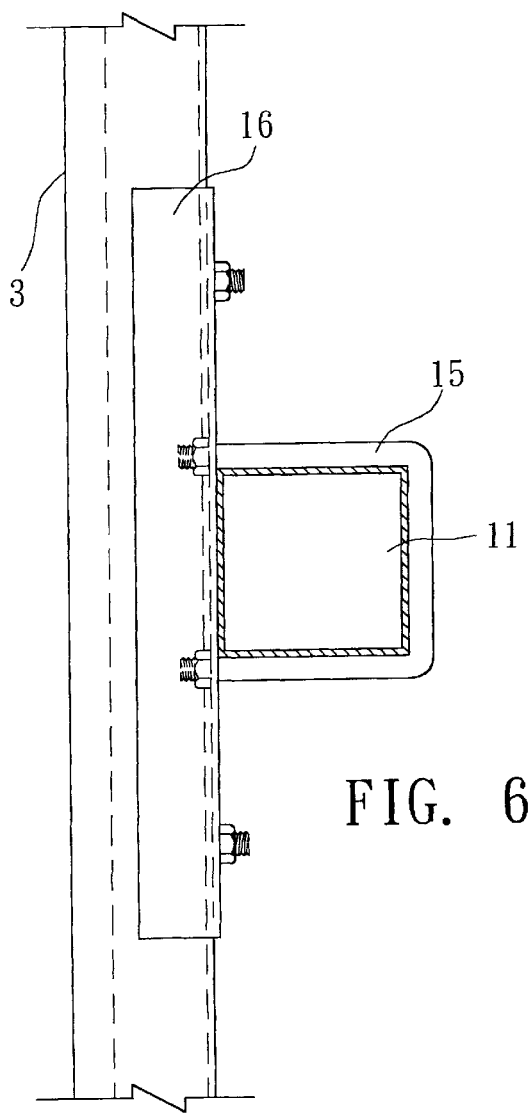
FIG. 6 shows the connection between the column and the horizontal press beam of the present invention.
Figure 6A:
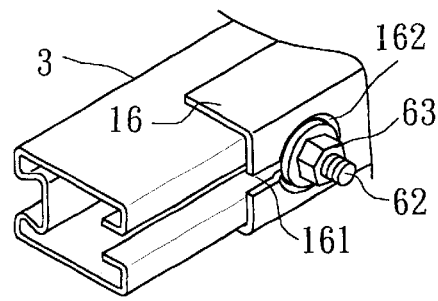
FIG. 6a is a perspective view of a part of FIG. 6.
Figure 7:
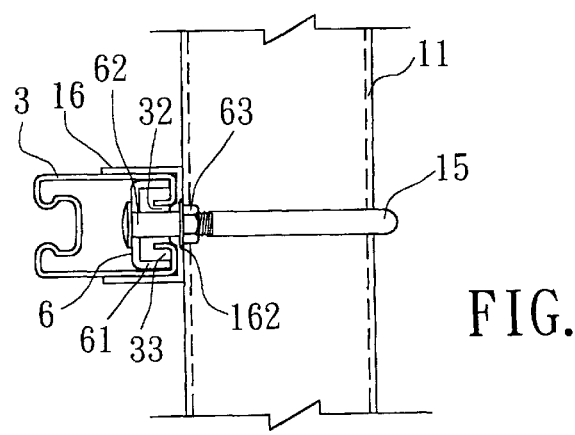
FIG. 7 is a side view according to FIG. 6.

Please refer to FIGS. 6 and 7, which show the connection A2 between the column and the transverse press beam of FIG. 1. The upright column 11 of the frame body 1 is connected with the transverse press beam 3 in such a manner that via a collar 15, a frame plate 16 is fixed on the upright column 11 by screws. The frame plate 16 is then inserted in the horizontal press beam 3. Two fixing plates 6 are inserted into the press beam 3. Each side of the frame plate 16 is formed with an inward extending split 161. An inner end of the split 161 is formed with a dent 162. The bolt 62 of the fixing plate 6 is fitted into the split 161 and the fixing nut 63 is positioned in the dent 162 and tightened on the bolt 62. Accordingly, the engaging plates 61 of the fixing plate 6 abut against the hook sections 33 of the press beams 3 to fix the horizontal press beam 3 on the upright column 11.

Figure 8:
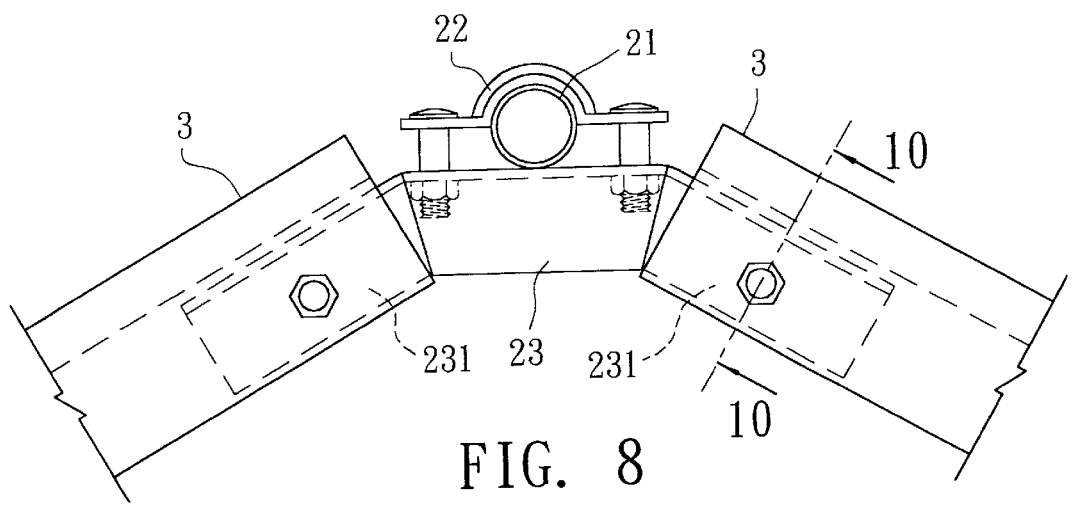
FIG. 8 shows the connection between the ridge beam of the roof and two lateral press beams of the present invention.
Figure 9:
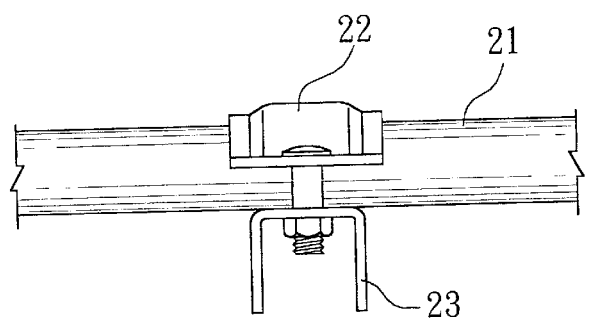
FIG. 9 is a side view showing that the connecting member is fixed on the ridge beam via the tube binder of the present invention.
Figure 10:
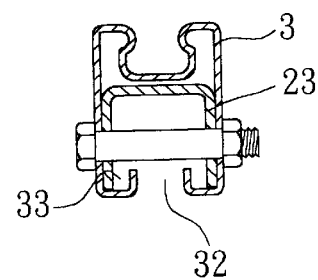
FIG. 10 is a sectional view taken along line 10—10 of FIG. 8.

Please refer to FIGS. 8 to 10, which show the connection B1 between the ridge beam and two lateral press beams of FIG. 2. The ridge beam 21 of the roof 2 is connected with the lateral press beams 3 in such a manner that via a tube binder 22, a connecting member 23 is fixed on the ridge beam 21 by screws. Each side of the connecting member 23 is formed with a connecting section 231, which is downward inclined by a certain inclination. The inclination of the connecting section 231 is equal to the inclination of the roof 2. The connecting section 231 is inserted into the interior of one end of the press beam and tightened by a bolt. The other end of the press beam 3 is fixedly connected with the draining flute 12 of the frame body 1.

Figure 11:
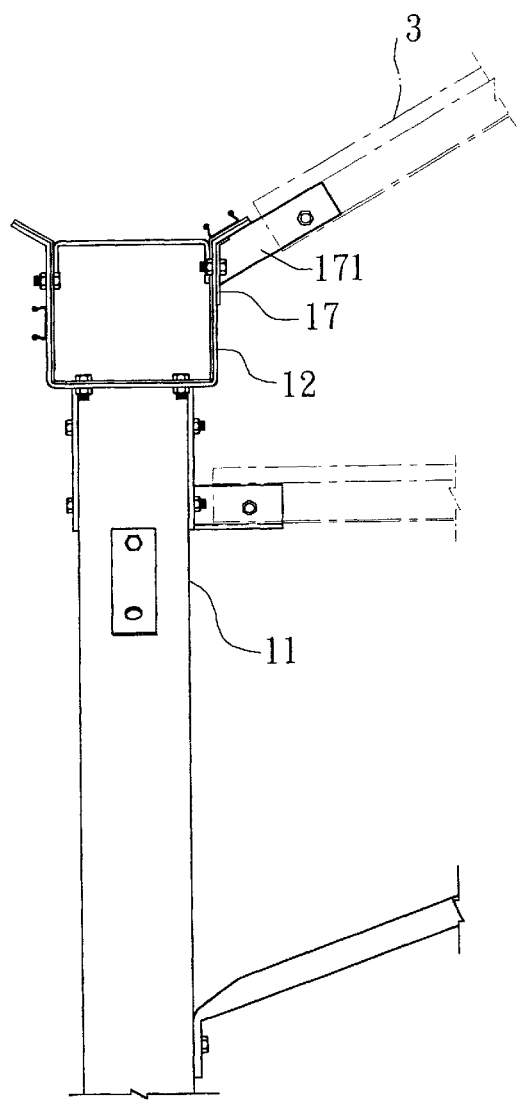
FIG. 11 shows the connection between the press beam of the roof and the draining flute of the present invention.
Figure 12:
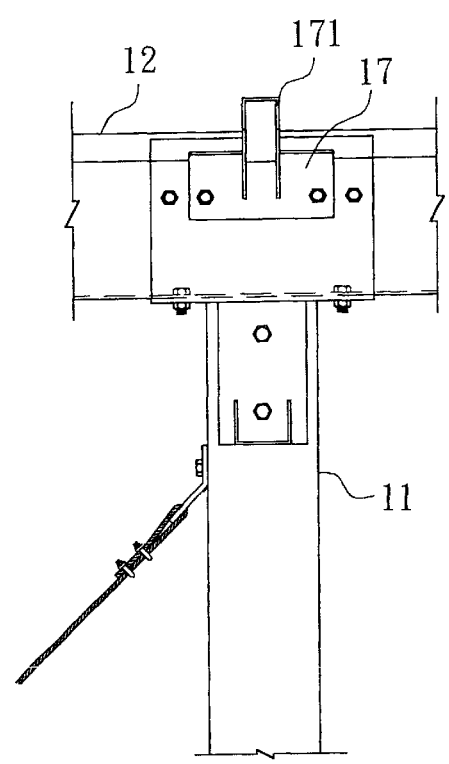
FIG. 12 is a side view according to FIG. 11.

Please refer to FIGS. 11 and 12, which show the connection B2 between the press beam of the roof and the draining flute of FIG. 2. The press beam 3 of the roof 2 is connected with the draining flute 12 in such a manner that a connecting plate 17 is fixed on one side of the draining flute 12 by screws. The connecting plate 17 has an upward inclined connecting section 171 which is inserted into the interior of the press beam 3 connected with the ridge beam 21 and tightened by a bolt. Accordingly, the press beam 3 of the roof 2 is fixedly connected with the draining flute 12 of the frame body 1.

Figure 14:
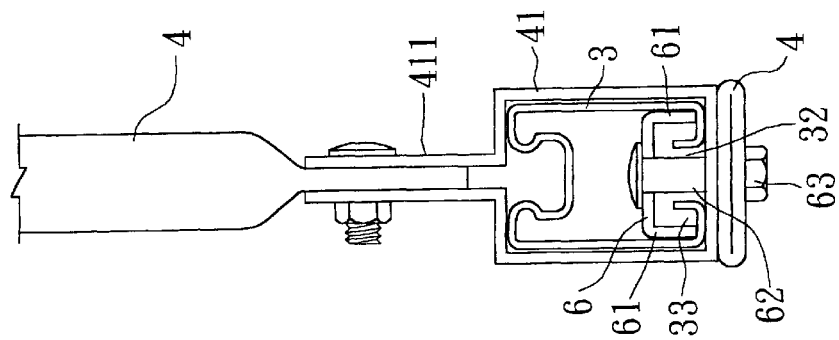
FIG. 14 is a side view according to FIG. 13.
Figure 13:
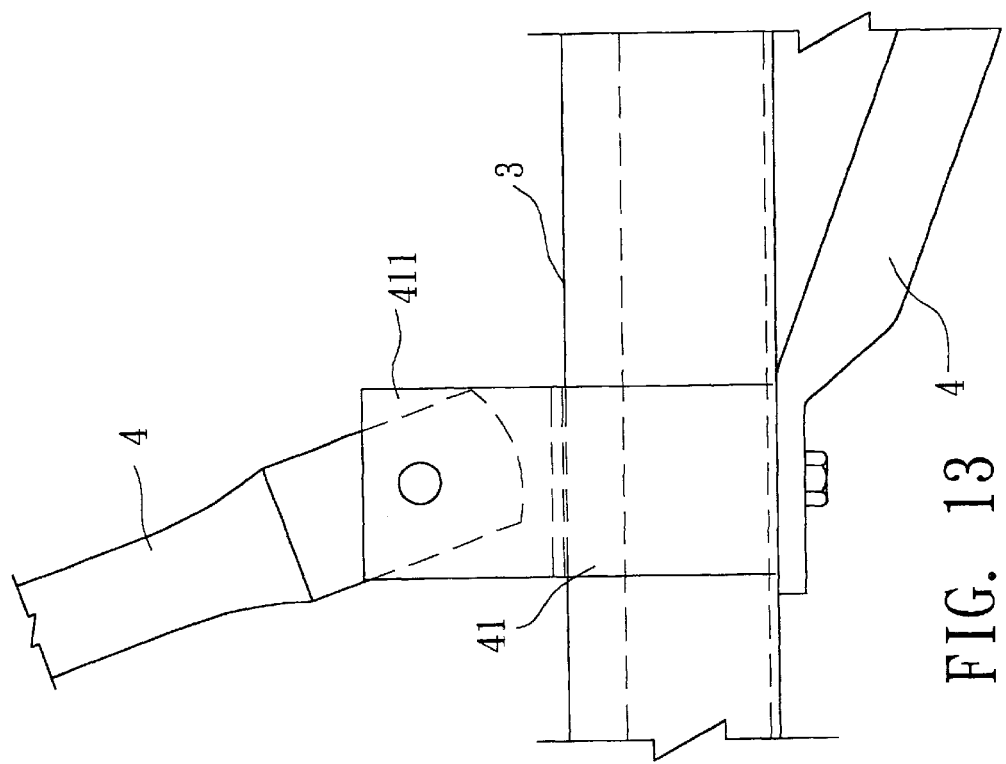
FIG. 13 shows that the support rod is connected with the frame body and the press beam of the roof via the fixing member of the present invention.

Please refer to FIGS. 13 and 14, which show the connection B3 between the support rod and the frame body and the press beam of the roof of FIG. 2. Also referring to FIG. 2, the support rod 4 is connected with the frame body 1 and the press beam 3 of the roof 2 in such a manner that a fixing member 41 is fitted on the press beam 3 near the top of the frame body 1. The fixing member 41 has an upward projecting clamping seat 411 for fixing one end of the support rod 4 by screw. The other end of the support rod 4 is fixedly connected with the bottom of the press beam 3 of the roof 2 and inserted in the press beam 3 via a fixing plate 6. The bolt 62 of the fixing plate 6 is fitted through the support rod 4 from the opening 32 of the press beam 3 and tightened by the fixing nut 63. Accordingly, the engaging plates 61 of the fixing plate 6 abut against the hook sections 33 of the press beams 3 to fix the support rod 4 on the press beam 3 of the roof 2. In addition, the bottom of the fixing member 41 is further fixedly connected with one end of another support rod 4. The other end of the other support rod 4 is fixedly connected with the column 11.

Figure 15:
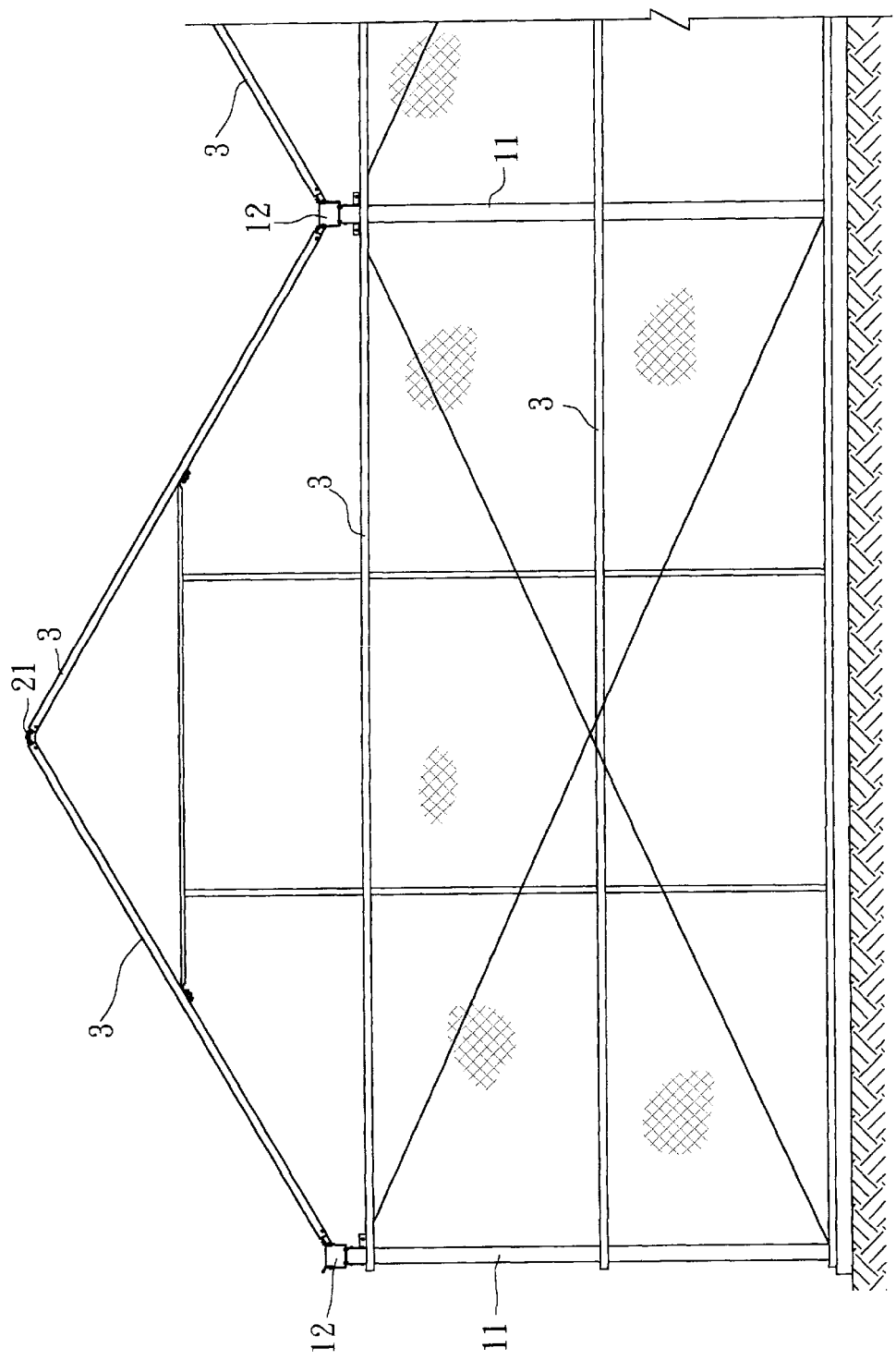
FIG. 15 shows that the trellises of the present invention are serially assembled.
Figure 16:
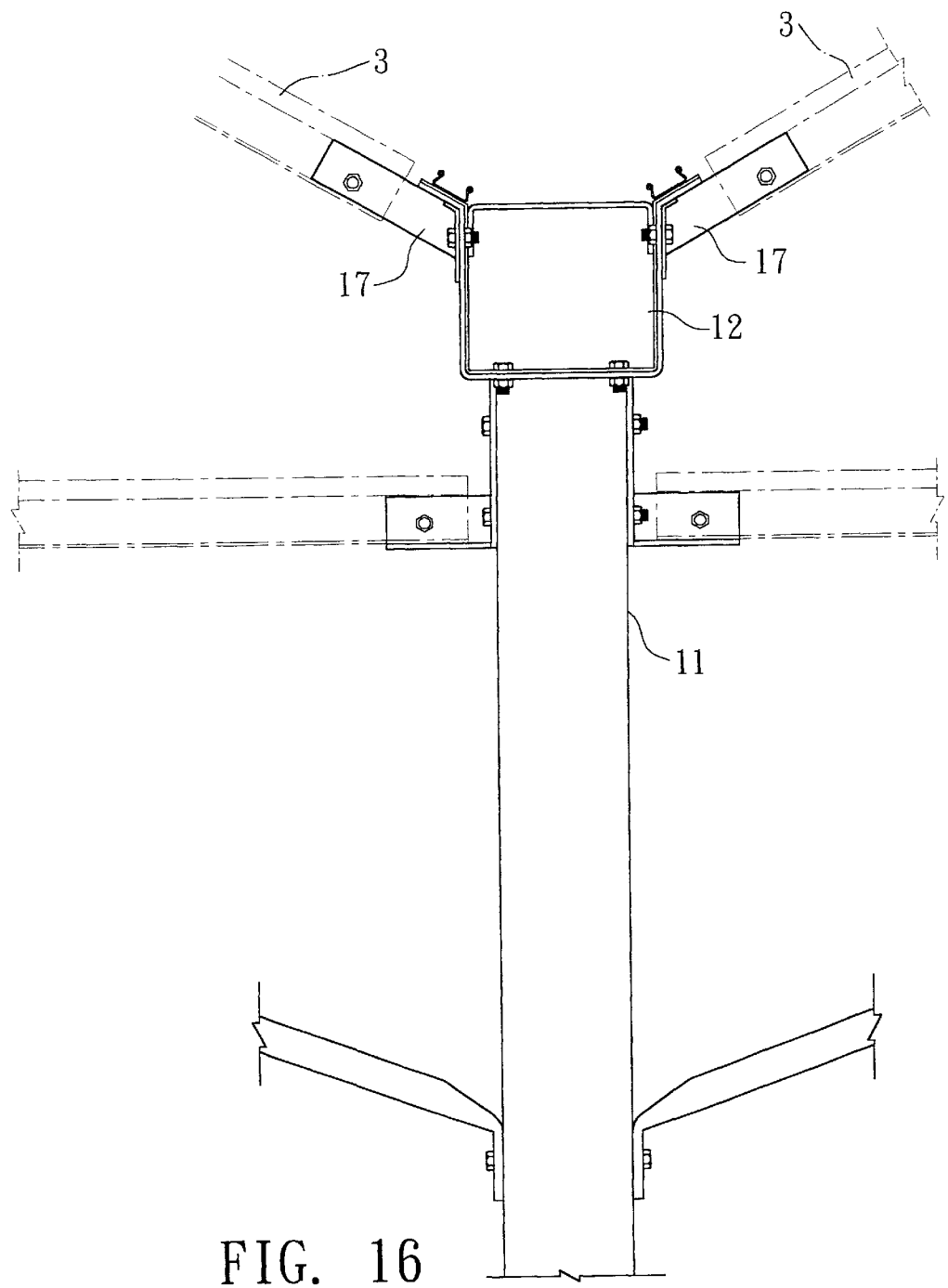
FIG. 16 shows the connection between two sides of the draining flute and the press beams of the roofs of the present invention.

FIGS. 15 and 16 that show a series of assemblies of the trellises. The connecting plates 17 can be fixed on both sides of the draining flute 12 of top end of the upright columns 11 so that the two connecting plates 17 can be two-way connected with the press beams 3 of the ridge beams 21 of two trellises. Accordingly, multiple trellises can be directly serially assembled as necessary without affecting the structure.

Moreover, when assembled, via the insertion plate 13 and the collar 15, the corner plate 14 and frame plate 16 can be previously fixed on the upright column 11. All the corner plates 14 and frame plates 16 can be adjusted to be at the same height. Thereafter, the press beams 3 can be directly fixed on the columns 11 via the corner plates 14 and frame plates 16 without being previously cut as in the conventional structure. Furthermore, multiple fixing plates 6 with the bolts 62 and fixing nuts 63 are previously inserted in the press beam 3 as necessary. Then the fixing plates 6 are moved to make the bolts 62 tightened with the corner plates 14 and frame plates 16. Accordingly, the assembling procedure is simplified.

Figure 17:
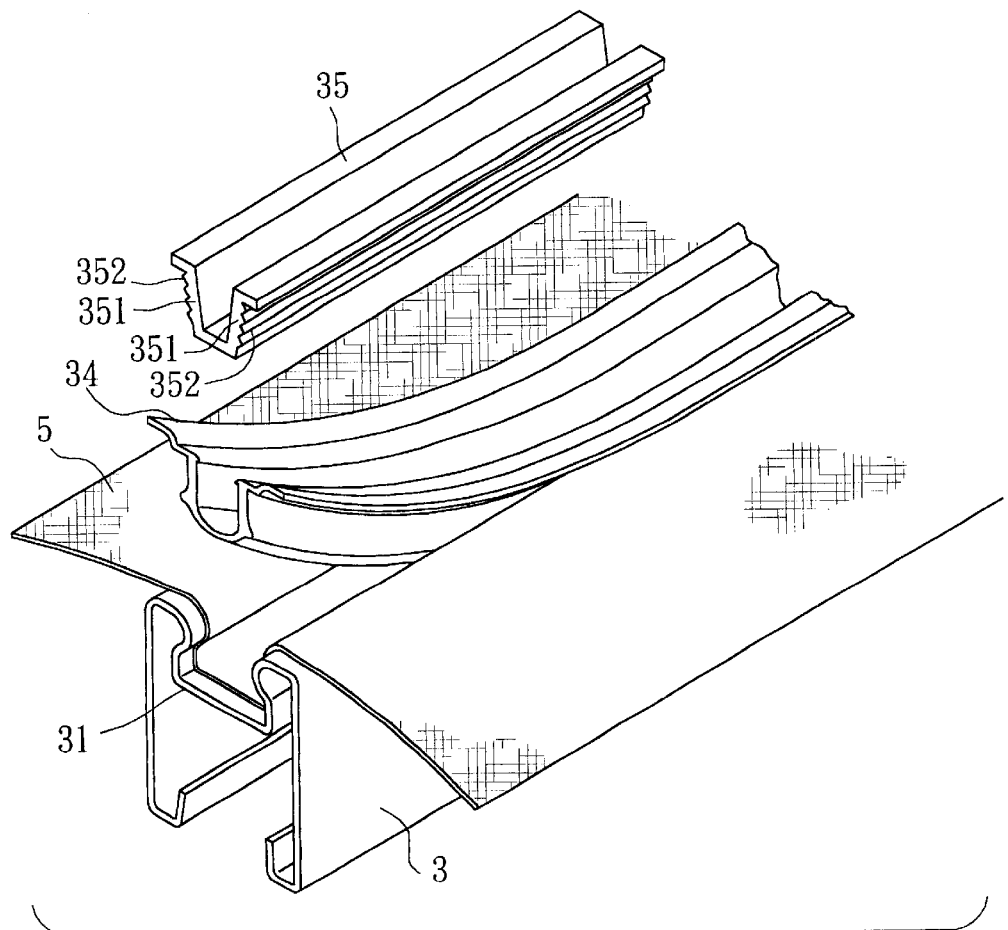
FIG. 17 shows that the light shading mesh is fixed on the press beam of the present invention.
Figure 18:
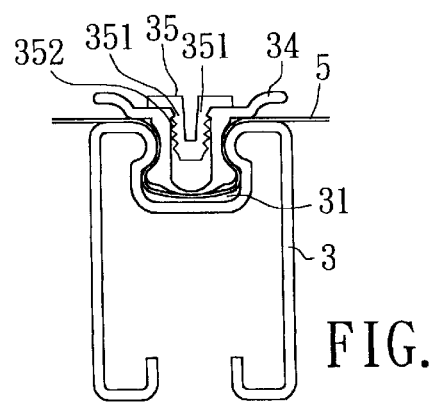
FIG. 18 shows that the light shading mesh is fixed in the insertion section of the press beam by the clamping plate of the present invention.

Besides, as shown in FIGS. 17 and 18, the press beam 3 is formed with the recessed insertion section 31. By means of a soft press bar 34, the mesh 5 can be inlaid in the insertion section 31 of the press beam 3 and then a clamping plate 35 is inserted into the press bar 34 to fix the mesh 5 on the press beam 3. The clamping plate 35 has a substantially V-shaped cross-section and two outward extending wing sections 351. The outer faces of the wing sections 351 are formed with several ribs 352. The wing sections 351 outward extend so that the ribs 352 will press the press bar 34 against the mesh 5 to fix the mesh 5 on the press beam 3. Therefore, the press beams 3 not only serve to support the trellis, but also serve to fix the mesh 5. Therefore, the members for fixing the mesh 5 in the conventional trellis can be omitted.

According to the above arrangement, the press beams of the trellis of the present invention have double functions of supporting the trellis and fixing the light shading mesh or plastic sheet. Therefore, the components of the trellis are simplified and the assembling procedure of the trellis is facilitated and the cost for the trellis is lowered.

Figure 19:
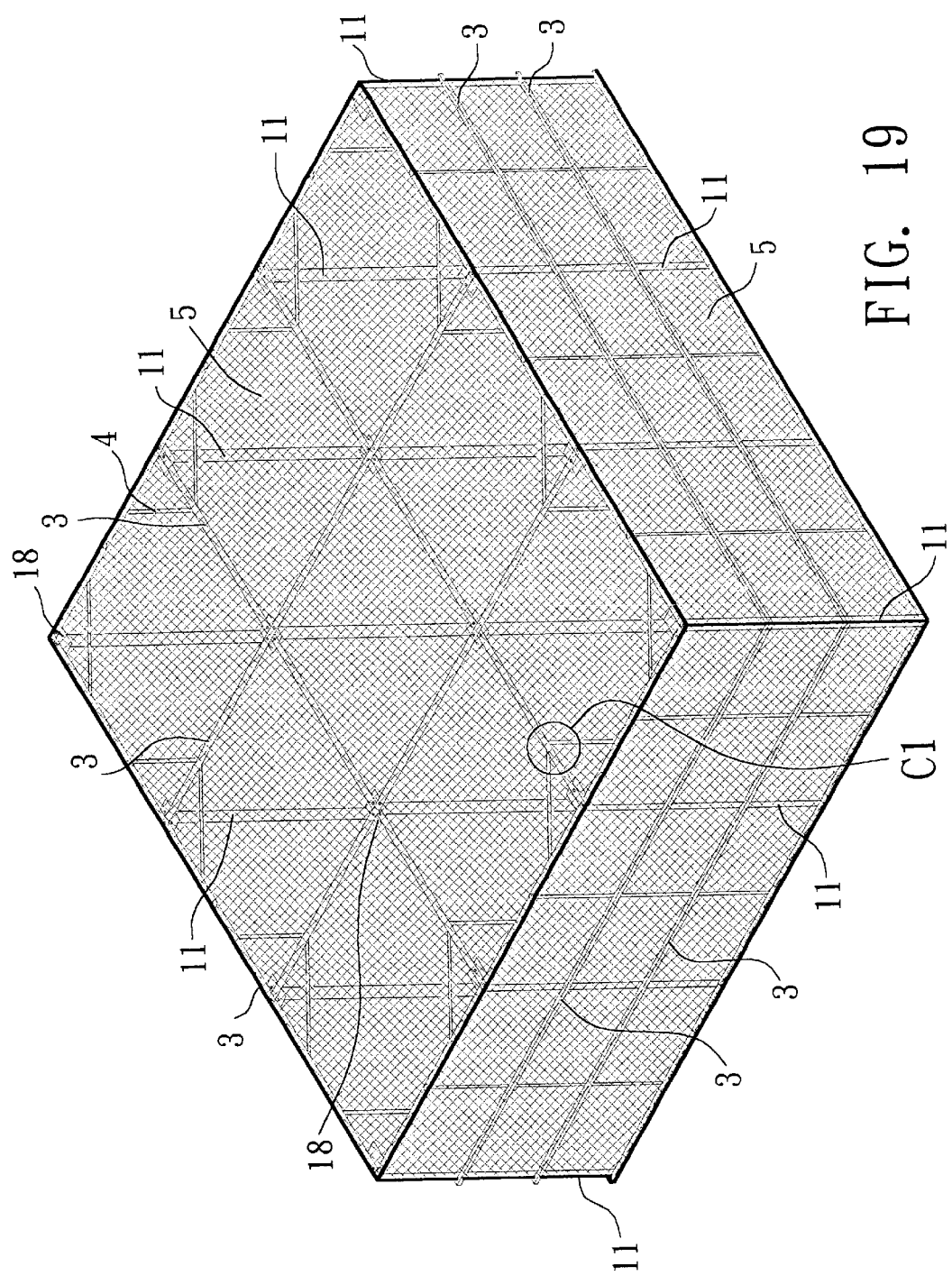
FIG. 19 is a perspective view of a second embodiment of the trellis of the present invention.
Figure 20:
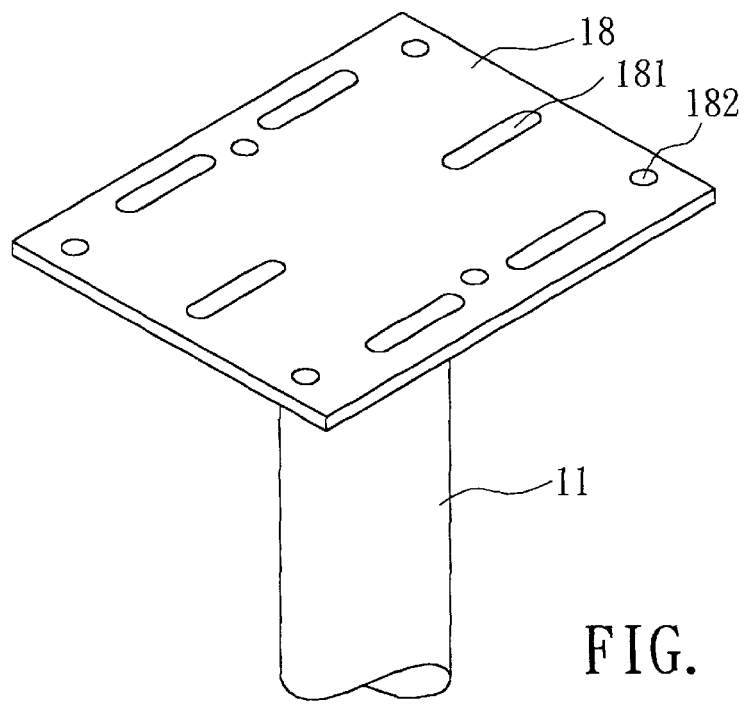
FIG. 20 is a perspective view of the top plate of the column of the second embodiment of the trellis of the present invention.
Figure 21:
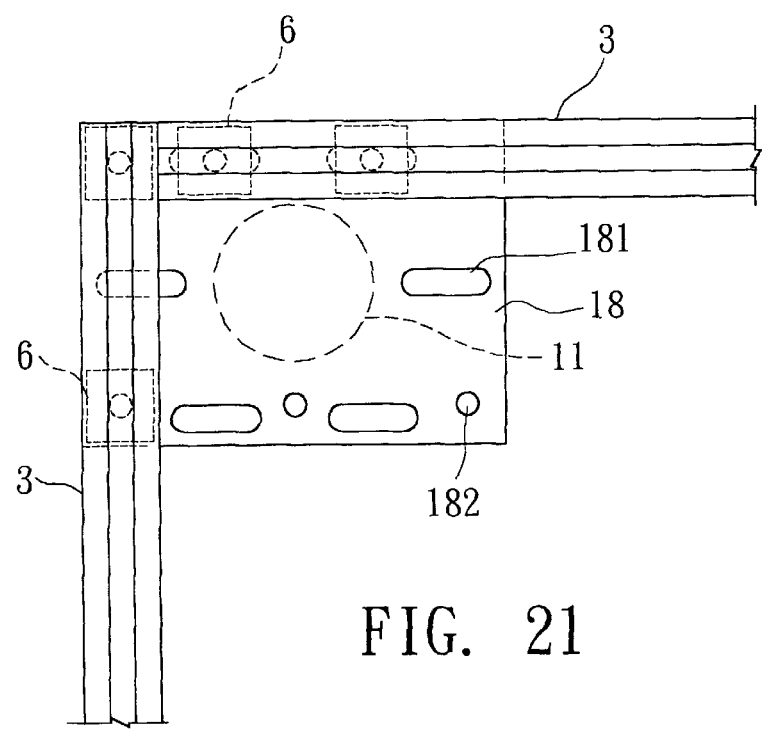
FIG. 21 shows that the press beams of the roof are connected with the top plate of the column of the second embodiment of the trellis of the present invention in L-shaped pattern.
Figure 22:
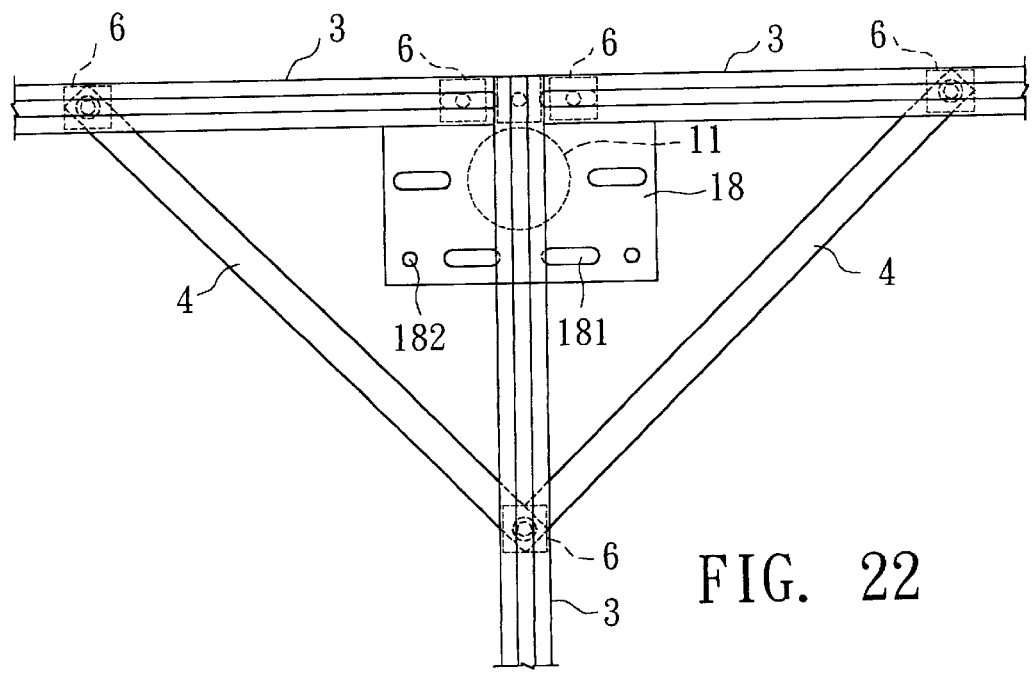
FIG. 22 shows that the press beams of the roof are connected with the top plate of the column of the second embodiment of the trellis of the present invention in T-shaped pattern.
Figure 23:
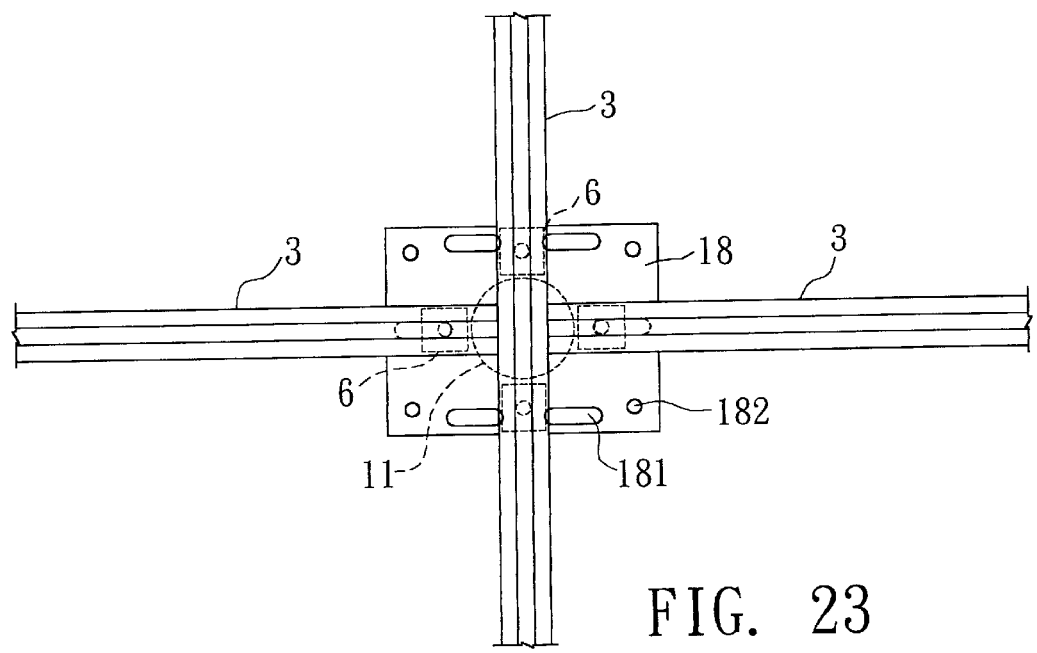
FIG. 23 shows that the press beams of the roof are connected with the top plate of the column of the second embodiment of the trellis of the present invention in cross-shaped pattern.

The above embodiment is only used to illustrate the present invention, not intended to limit the scope thereof. Many modifications of the above embodiment can be made without departing from the spirit of the present invention. For example, FIGS. 19 and 20 that show a second embodiment of the present invention, in which the top end of the column 11 of the frame body 1 has a top plate 18 perpendicularly connected with the column 11. The top plate 18 is formed with several slots 181 and circular holes 182 for fixing multiple horizontal press beams 3. The support rods 4 are connected between the press beams 3 to form a plane roof 2.

Referring to FIGS. 21 to 24, by means of the slots 181 and circular holes 182 of the top plate 18 of the column 11, the press beams 3 of the roof 2 can be freely fixedly connected. No matter whether the press beams 3 are connected into an L-shaped pattern, T-shaped pattern or cross-shaped pattern, the press beams 3 can be fixedly connected via the top plate 18. When connected, the fixing plate 6 is inserted into the press beam 3 and then the bolt 62 of the fixing plate 6 is fitted through the slot 181 or circular hole 182 of the top plate 18 from the opening 32 of the press beam 3. Then the fixing nut 63 is tightened on the bolt 62. Accordingly, the engaging plates 61 of the fixing plate 6 abut against the hook sections 33 of the press beams 3 to fix the press beam 3 on the top plate 18 of the column 11 to form the roof 2.

Figure 24:
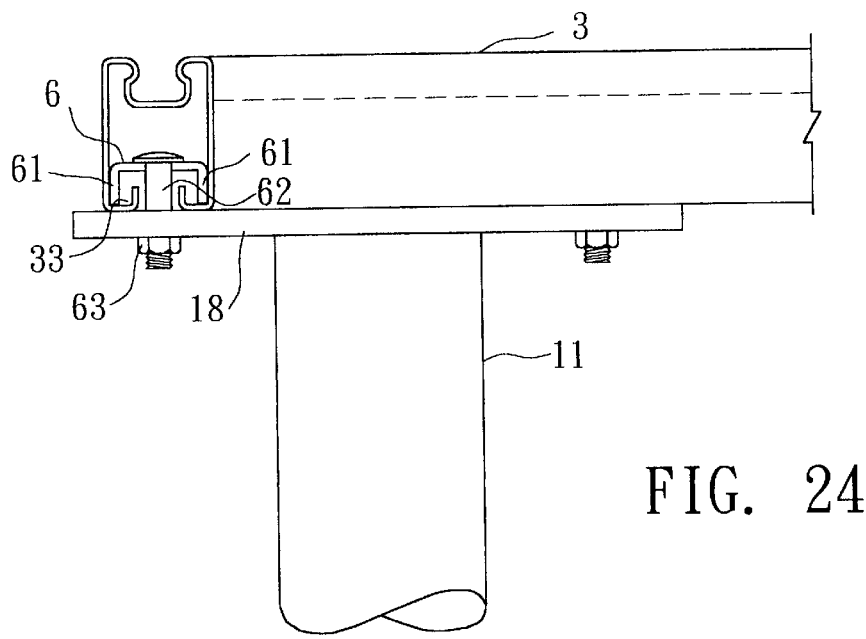
FIG. 24 shows that the press beams are connected with the top plate of the column of the second embodiment of the trellis of the present invention by a fixing plate.
Figure 25:
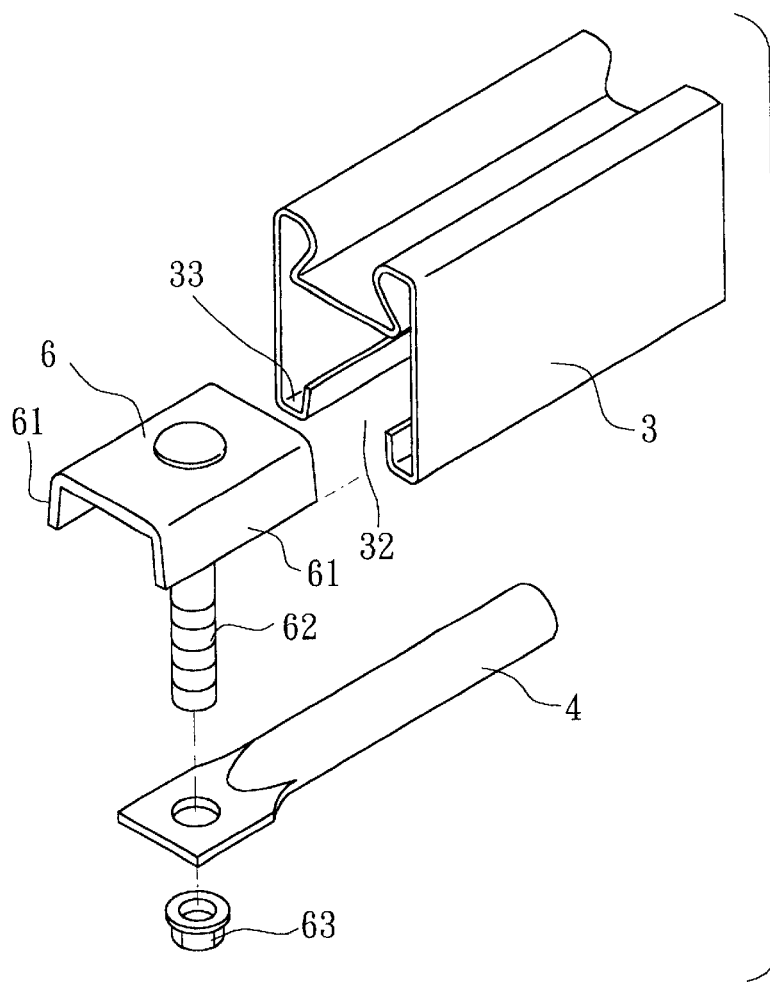
FIG. 25 is perspective exploded view showing the connection between the press beam and the support rod of the second embodiment of the trellis of the present invention.
Figure 26:
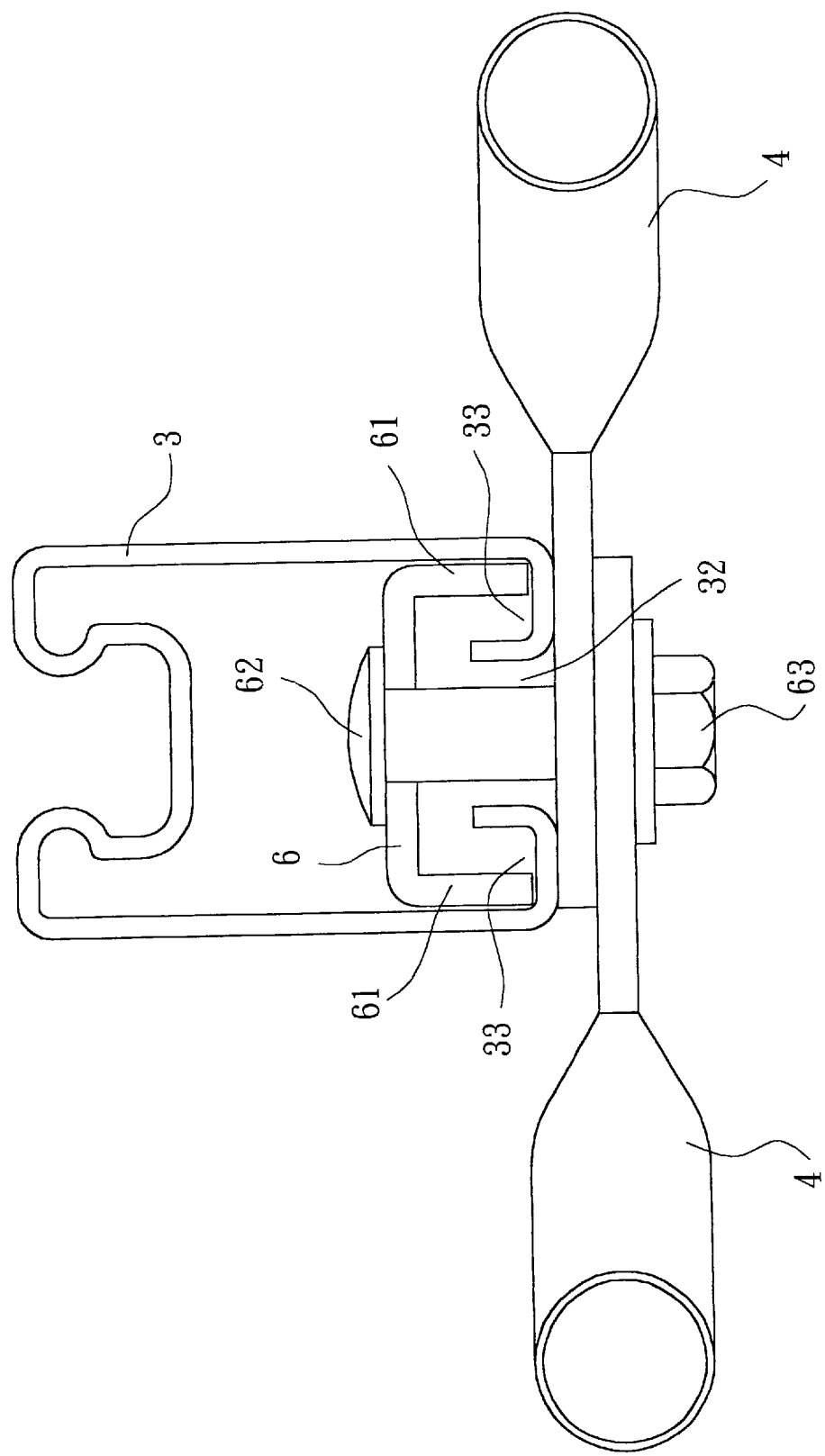
FIG. 26 is a sectional view showing the connection between the press beam and two support rods of the second embodiment of the trellis of the present invention.
Figure 27:
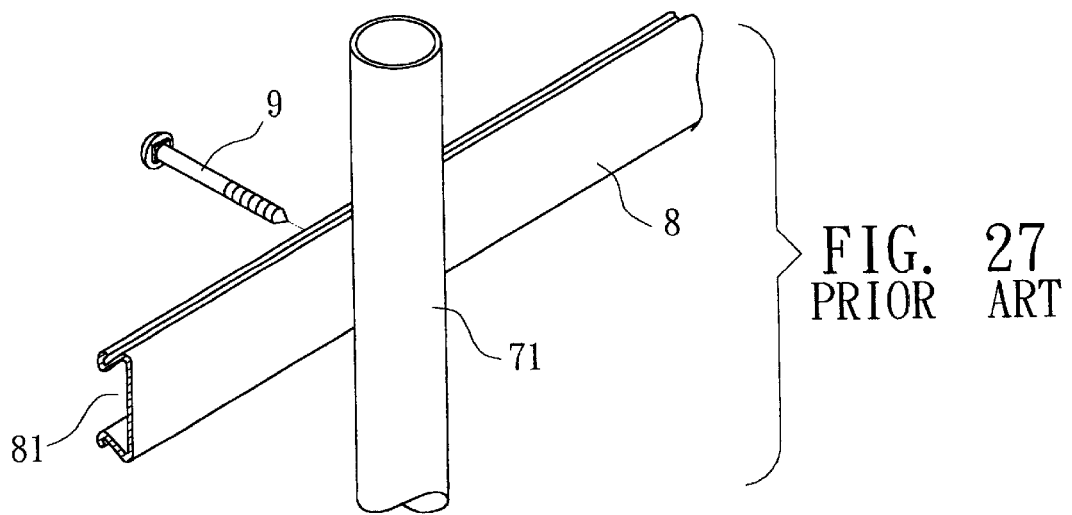
FIG. 27 shows that the column of a conventional trellis is connected with the fixing member by a connecting member.
Figure 28:
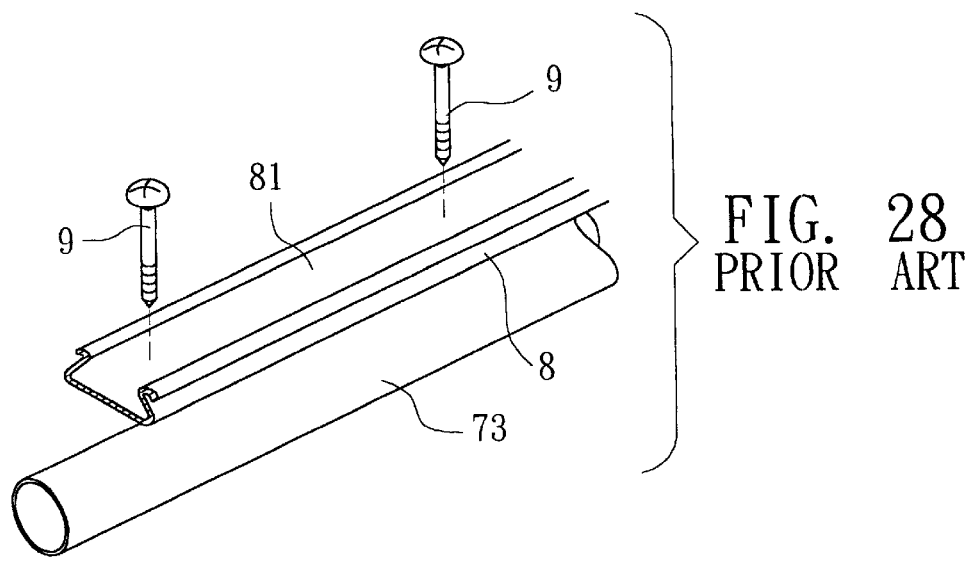
FIG. 28 shows that the ridge of the conventional trellis is connected with the fixing member by the connecting member.
Figure 29:
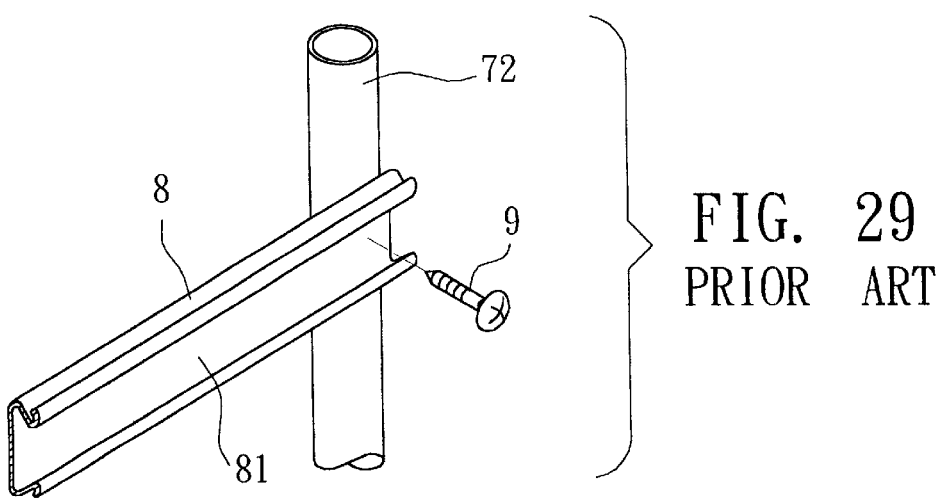
FIG. 29 shows that the transverse beam of the conventional trellis is connected with the fixing member by the connecting member.

Please refer to FIGS. 24 and 25, which show the connection C1 between the press beam and the support rod of FIG. 18. Two ends of the support rod 4 are inserted into the press beam 3 via two fixing plates 6. The bolts 62 of the fixing plates 6 are fitted through two ends of the support rod 4 from the opening 32 of the press beam 3. Then the fixing nut 63 is tightened on the bolt 62. Accordingly, the engaging plates 61 of the fixing plate 6 abut against the hook sections 33 of the press beams 3 to respectively fix two ends of the support rod 4 on the press beam 3.

What is claimed is:

1. A trellis structure comprising a frame body and a roof covered on the frame body, the frame body including multiple upright columns which define a range with a fixed area, the frame body further including multiple press beams being transversely connected with the upright columns along the periphery of the frame body, multiple press beams being connected with top face of the frame body to form the roof, multiple support rods being fixedly connected between the roof and the frame body for reinforcing the press beams, the periphery of the frame body and the roof being covered by a shading mesh, the press beam being hollow, a first side of the press beam being formed with a recessed insertion section, while a second side of the press beam being formed with an opening, two opposite sides of the opening respectively each having a inward extending hook section, via the insertion section, the press beam being outward fixedly connected on the frame body and the roof, the shading mesh being partially inserted in the insertion section of the press beam, a press bar being disposed in the insertion section, a clamping plate being inserted in the press bar for fixing the press bar to press the mesh, the clamping plate having a substantially V-shaped cross-section and two outward extending wing sections, outer faces of the wing sections being formed with several ribs, whereby the wing sections outward extend so that the ribs will press the press bar against the mesh to fix the mesh on the press beam, the trellis structure further comprising multiple fixing plates, two longitudinal sides of each fixing plate respectively having two perpendicularly extending engaging plates for engaging with the hook sections of the press beam, a bolt being perpendicularly fitted through a center of the fixing plate, a fixing nut being used in cooperation with the bolt.

2. The trellis structure as claimed in claim 1 further comprising a longitudinally extending draining flute connected between top ends of each of the two lateral columns of the frame body, multiple press beams being connected between the draining flutes, whereby the roof can be formed on the top face of the frame body, the roof having a ridge beam disposed above a center-line of the frame body, the press beams connected between the draining flutes of the frame body being upward inclined and fixedly connected with two sides of the ridge beam, multiple support rods being fixedly connected between the lateral columns of the frame body and the corresponding press beams of the roof.

3. The trellis structure as claimed in claim 2, wherein the ridge beam of the roof is connected with the press beams on two sides thereof in such a manner that via a tube binder, a connecting member is fixed on the ridge beam by screws, each side of the connecting member being formed with a connecting section which is downward inclined by a certain inclination, the inclination of the connecting section being equal to the inclination of the roof, the connecting section being inserted into the interior of a first end of the press beam and tightened by a bolt, a second end of the press beam being fixedly connected with the draining flute on the columns of the frame body.

4. The trellis structure as claimed in claim 2, wherein the support rod has a first end fixedly connected with a fixing member which is fitted on each end of the press beam between the lateral columns of the frame body near the top end thereof, the fixing member having an upward projecting clamping seat for fixing the first end of the support rod by screw, the support rod having a second end fixedly connected with the bottom of the press beam of the roof and inserted into the press beam via a fixing plate, the bolt of the fixing plate being fitted through the support rod from the opening of the press beam and tightened by the fixing nut, whereby the engaging plates of the fixing plate abut against the hook sections of the press beams to fix the support rod on the press beam of the roof, the bottom of the fixing member being fixedly connected with the first end of an adjacent support rod, the second end of the adjacent support rod being fixedly connected with the lateral column of the frame body.

5. The trellis structure as claimed in claim 1, wherein the top end of the column of the frame body has a top plate perpendicularly connected with the column, the top plate being formed with several slots and circular holes for fixing multiple horizontal press beams, the support rods being connected between the press beams to form a plane roof.

6. The trellis structure as claimed in claim 5, wherein when the support rods are connected between the press beams, two ends of the support rod are respectively inserted in the press beam via the fixing plate and then the bolt of the fixing plate is fitted through two ends of the support rod from the opening of the press beam, then the fixing nut being tightened on the bolt, whereby the engaging plates of the fixing plate abut against the hook sections of the press beam to fix two opposite ends of the support rod on the press beam.

7. The trellis structure as claimed in claim 1, wherein the upright column in the corner of the frame body is connected with two lateral press beams such that, via an insertion, a substantially L-shaped corner plate is fixed on the corner of the upright column by screws, the corner plate being inserted in the two press beams which are normal to each other, two fixing plates being respectively inserted into the press beams, each side of the corner plate being formed with an inward extending split, an inner end of the split being formed with a dent, the bolt of the fixing plate being fitted into the split and the fixing nut being positioned in the dent and tightened on the bolt, whereby the engaging plates of the fixing plate abut against the hook sections of the press beams to fix the two lateral press beams on the column.

8. The trellis structure as claimed in claim 1, wherein the column of the frame body is connected with the transverse press beam such that, via a collar, a frame plate is fixed on the column by screws, the frame plate being inserted in the transverse press beam, two fixing plates being inserted into the press beam, each side of the frame plate being formed with an inward extending split, an inner end of the split being formed with a dent, the bolt of the fixing plate being fitted into the split and the fixing nut being positioned in the dent and tightened on the bolt, whereby the engaging plates of the fixing plate abut against the hook sections of the press beams to fix the horizontal press beam on the column.

9. The trellis structure as claimed in claim 1, wherein the press beam of the roof is connected with the draining flute such that a connecting plate is fixed on one side of the draining flute by screws, the connecting plate having a connecting section which is inserted into the interior of the press beam connected with the ridge beam and tightened by a bolt, whereby the press beam of the roof is fixedly connected with the draining flute connected with the top ends of the columns.

10. The trellis structure as claimed in claim 9, wherein two connecting plates are fixed on two opposite sides of the draining flute that is connected with the top ends of the columns, whereby the two connecting plates can be connected with the press beams of the ridge beams of two adjacent trellises to serially connect multiple trellises with one another.

* * * * *